United States Patent
Hu et al.

(10) Patent No.: US 8,386,607 B2
(45) Date of Patent: Feb. 26, 2013

(54) METHOD AND SYSTEM FOR UTILIZING A RESOURCE CONDUCTOR TO OPTIMIZE RESOURCE MANAGEMENT IN A DISTRIBUTED COMPUTING ENVIRONMENT

(75) Inventors: Yonggang Hu, Richmond Hill (CA); Onkar S. Parmar, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1025 days.

(21) Appl. No.: 11/735,115

(22) Filed: Apr. 13, 2007

(65) Prior Publication Data

US 2008/0256238 A1  Oct. 16, 2008

(51) Int. Cl.
*G06F 15/173* (2006.01)
*G06F 9/46* (2006.01)
(52) U.S. Cl. ......... 709/226; 709/223; 718/104; 718/105
(58) Field of Classification Search .................. 709/223, 709/226; 718/104, 105
See application file for complete search history.

(56) References Cited

U.S. PATENT DOCUMENTS

| | | | |
|---|---|---|---|
| 2002/0124103 A1* | 9/2002 | Maruyama et al. | 709/234 |
| 2005/0021530 A1* | 1/2005 | Garg et al. | 707/100 |
| 2005/0055696 A1* | 3/2005 | Betzler et al. | 718/100 |
| 2005/0120095 A1* | 6/2005 | Aman et al. | 709/219 |
| 2005/0183084 A1* | 8/2005 | Cuomo et al. | 718/100 |

* cited by examiner

*Primary Examiner* — Ranodhi Serrao
(74) *Attorney, Agent, or Firm* — James L. Baudino; Libby Z. Toub

(57) ABSTRACT

Disclosed herein are embodiments of a method and system for optimizing resource management in a distributed computing environment through the use of a resource conductor. An application managed by an application manager requires resources managed by a resource manager. A resource conductor in communication with both the application manager and the resource manager receives from the application manager a processing specification for the application and workload associated with the application. The processing specification provides the resource conductor with information needed to determine the type and quantity of resources appropriate for processing the workload associated with the application. The resource conductor adjusts the quantity of resources allocated to the application by communicating with the resource manager.

28 Claims, 3 Drawing Sheets

METHOD AND SYSTEM FOR UTILIZING A RESOURCE CONDUCTOR TO OPTIMIZE RESOURCE MANAGEMENT IN A DISTRIBUTED COMPUTING ENVIRONMENT

TECHNICAL FIELD

The present disclosure generally relates to optimizing resource management in distributed computing environments and specifically relates to methods and systems for achieving efficient utilization of available shared resources through the use of a resource conductor.

BACKGROUND

To meet changing customer requirements, businesses today must offer customers more and better services. At the same time, they must continue to operate efficiently to remain viable in increasingly competitive environments. Consequently, businesses are moving toward a service-based paradigm in which monolithic applications requiring dedicated IT resources such as servers, storage, and networking devices are replaced with business processes that share and optimize these and other IT resources.

In an exemplary system facilitating such a paradigm shift, systems infrastructure software delivers a shared, virtualized pool of IT resources to meet the demands of multiple application types based on business policies. These multiple application types, such as batch processes, online processes, transactional processes, parallel processes, data-centric processes, and management applications, generally comprise a set of potentially heterogeneous independent workload components with differing resource requirements. Maximum efficiency is achieved in the distributed computing environment when each application has access to precisely the resources that it needs for precisely the length of time that it needs them. When a resource remains allocated to an application beyond the time required for processing the application's workload, the resource is idle, resulting in the application processing costing more in terms of computing resources than necessary. On the other hand, if an application must wait for a needed resource to be requested and allocated, the application takes longer to run than necessary, increasing response times and reducing throughput. One way to maximize efficiency in the distributed computing environment is to provide for separate application management and resource management. Decoupling application management from resource management also maximizes system scalability as well as system performance capability. To achieve such an efficient, scalable, high performance environment, a component is needed between the various application managers and the various resource managers to ensure that shared resources are allocated among applications as efficiently as possible and to maintain consistency and reliability within the entire system.

BRIEF SUMMARY

Disclosed herein are embodiments of a method and system for optimizing resource management in a distributed computing environment through the use of a resource conductor. In an exemplary embodiment, an application managed by an application manager requires resources managed by a resource manager. A resource conductor in communication with both the application manager and the resource manager receives from the application manager a processing specification for the application and workload associated with the application. The processing specification provides the resource conductor with information needed to determine the type and quantity of resources appropriate for processing the workload associated with the application.

The processing specification comprises a resource type identifier component and a separate Service Level Agreement component. The resource type identifier component determines what type of resource is required to process the workload. The Service Level Agreement component provides the resource conductor with information necessary to properly determine the quantity of resources identified by the resource type identifier that should be allocated to the application in order to process the workload. The resource conductor adjusts the quantity of resources allocated to the application by communicating with the resource manager, either by requesting additional resources for the application or by releasing excess resources no longer appropriate for the application.

DETAILED DESCRIPTION

Various aspects of a method and system for optimizing resource management in a distributed computing environment through the use of a resource conductor according to the present disclosure are described. It is to be understood, however, that the following explanation is merely exemplary in describing aspects of the present disclosure.

Figure 1:
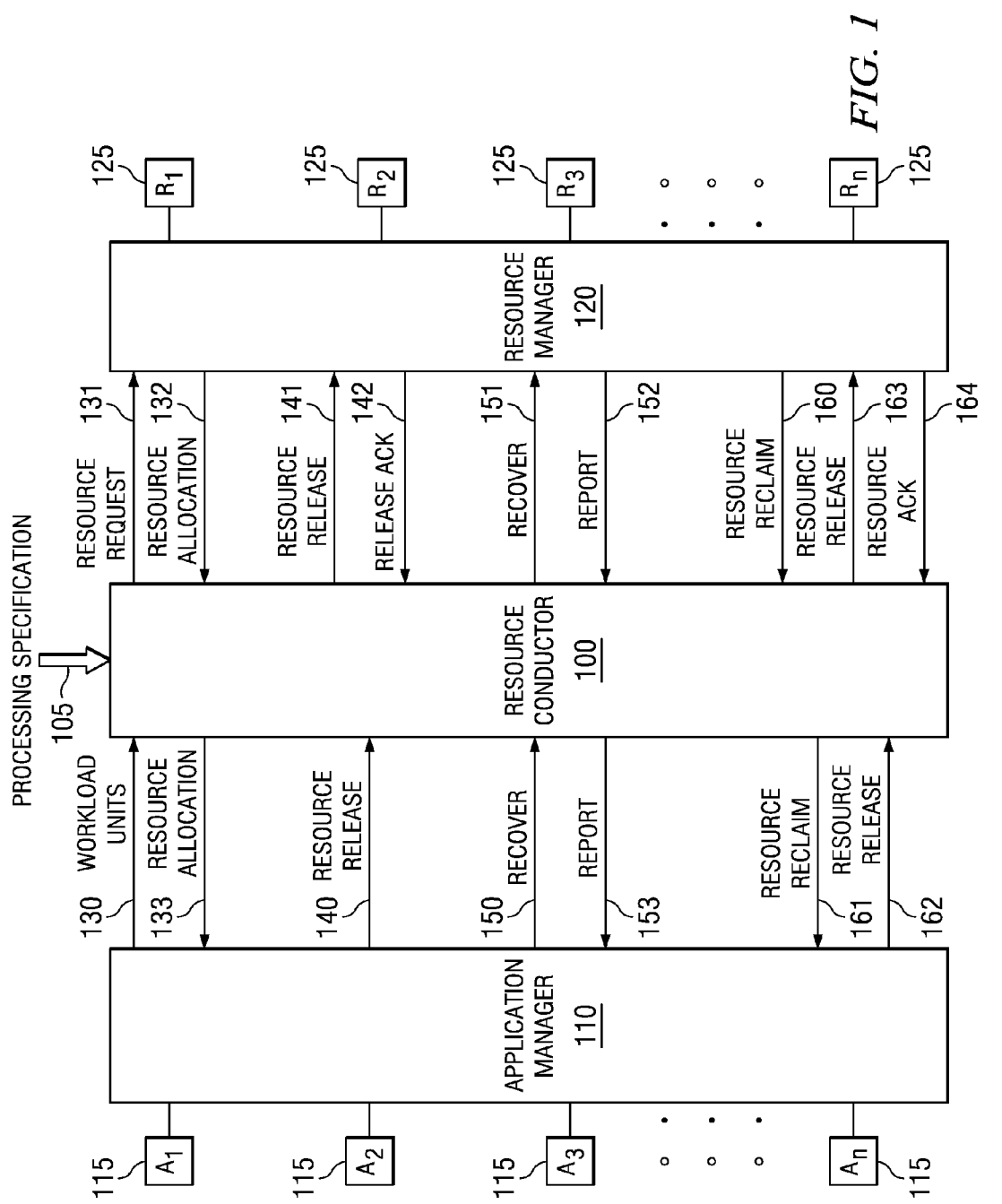
FIG. 1 is a block diagram depicting an exemplary system for achieving efficient utilization of available shared resources in a distributed computing environment through the use of a resource conductor.

FIG. 1 is a block diagram depicting an exemplary system for achieving efficient utilization of available shared resources in a distributed computing environment through the use of a resource conductor. In the embodiment shown, applications 115 represent multiple application types, such as batch processes, online processes, transactional processes, parallel processes, data-centric processes, management applications, and other application types. The processing of these representative applications is collectively managed by application manager 110.

For each application, application manager 110 identifies a set of potentially heterogeneous independent workload units with differing resource requirements, and provides 130 these workload units to resource conductor 100. In some embodiments, these workload units are provided 130 individually in separate communications to resource conductor 100. In alternative embodiments, multiple workload units are provided 130 to resource conductor 100 in a single communication. In some embodiments, application manager 110 waits until provided workload units have been processed before sending additional workload units. In alternative embodiments, application manager 110 sends additional workload units without waiting for previously sent workload units to be processed.

In embodiments not depicted in FIG. 1, the application manager provides alternatives to workload units rather than actual workload units to the resource conductor. For example, the application manager may provide workload statistics, such as the number of pending workload units, the turnaround time per workload unit, or the processing throughput, to the resource conductor.

In a preferred embodiment, application manager 110 identifies a set of heterogeneous independent workload units with differing resource requirements, and provides 130 these workload units to resource conductor 100. These workload units are provided 130 individually in separate communications to resource conductor 100. Application manager 110 sends each successive workload unit without waiting for the previously sent workload units to be processed.

Prior to or in conjunction with receiving the workload units associated with a particular application, resource conductor 100 also receives processing specification 105 for the application. Processing specification 105 provides resource conductor 100 with information needed to determine the type and quantity of resources appropriate for processing the workload units. In some embodiments, the information provided by processing specification 105 arrives in a single discrete information package from a single source, while in other embodiments, the information is divided into separate packages and is provided independently by multiple sources.

In a preferred embodiment, processing specification 105 comprises a resource type identifier component and a separate Service Level Agreement component. The resource type identifier component determines what type of resource is required to process the workload unit and is provided to resource conductor 100 by application manager 110, either concurrently with the workload unit or as a separate transmission. The resource type identifier may specify a particular resource type (e.g., a server, a desktop, a load balancer, a web server, a data set, a software license), and may further specify required resource attributes (e.g., a CPU running Linux, a server with 1 G memory), as well as other resource characteristics.

The Service Level Agreement (SLA) component provides resource conductor 100 with information necessary to properly determine the quantity of resources identified by the resource type identifier that should be allocated to the application. The SLA may be unique to an individual application, or may cover multiple applications. The SLA may be unique to a particular resource type, or may cover multiple resource types. Examples of SLAs include those configured to minimize resource allocation, those configured to minimize response time, those configured to minimize cost, and those configured to model historical resource allocation patterns. Other configurations are contemplated.

Using the information provided in the SLA, resource conductor 100 determines a quantity R. This quantity R represents a quantity of resources of the type specified by the resource type identifier that should be allocated to the application for processing the pending workload units. The quantity R can be a single integer value or a range of integer values.

In a preferred embodiment, the quantity R is a range of integer values, wherein the low boundary of the range for R represents the minimum quantity of resources appropriate for processing the total pending workload for the application in accordance with the SLA, while the high boundary of the range for R represents the maximum quantity of resources appropriate for processing the total pending workload for the application in accordance with the SLA.

Resource conductor 100 uses the quantity R in determining how to adjust a quantity N, wherein the quantity N is the quantity of resources currently allocated to the application. If N is equal to R, or if N falls within the range represented by R, then the appropriate number of resources are allocated to the application. If N is not equal to R, or if N falls outside of the range represented by R, then resource conductor 100 will adjust N by either requesting additional resources for the application or releasing excess resources no longer appropriate for the application. The following two exemplary scenarios illustrate how resource conductor 100 optimizes resource management according to a preferred embodiment.

Scenario 1: A resource conductor 100 optimizing CPU allocation while satisfying a Service Level Agreement configured to guarantee throughput is constrained by a high water mark threshold (HWM) and a low water mark threshold (LWM). HWM represents the maximum processing capacity per CPU in workload units/CPU. LWM represents the minimum processing capacity per CPU in workload units/CPU. These thresholds may be supplied to resource conductor 100 or may be calculated by resource conductor 100. In this example, the high and low boundaries for R are represented mathematically as follows:

$$R_{low} = \text{ceiling[total pending workload units}/HWM]$$

$$R_{high} = \text{floor[total pending workload units}/LWM]$$

If HWM=5 workload units/CPU, and LWM=3 workload units/CPU, and if the total number of pending workload units is 31, then $R_{low}$=7 CPUs and $R_{high}$=10 CPUs. This means that a range of 7 to 10 CPUs are appropriate to guarantee the Service Level Agreement governing the particular application. Under these conditions, resource conductor 100 would obtain additional CPUs for an application currently allocated less than 7 CPUs, and would release CPU resources in excess of 10. This strategy allows resource conductor 100 to guarantee the throughput Service Level Agreement without retaining unnecessary resources.

Scenario 2: A resource conductor 100 optimizing CPU allocation while satisfying a Service Level Agreement configured to guarantee response time is also constrained by HWM and LWM, but is further constrained by the number of resources required to guarantee the response time (RT), which may be supplied to resource conductor 100 or may be calculated by resource conductor 100. In this example, the high and low boundaries for R are represented mathematically as follows:

$$R_{low} = \text{ceiling[total pending workload units}/HWM]$$

$$R_{high} = \max[\text{floor[total pending workload units}/LWM], RT]$$

If HWM=5 workload units/CPU, and LWM=3 workload units/CPU, and if the total number of pending workload units is 31, then $R_{low}$=7 CPUs, the same as in Scenario 1. However, because $R_{high}$ is dependent on RT as well as LWM, $R_{high}$=10 CPUs only if RT is no greater than 10 CPUs. If RT=12, for example, then $R_{high}$=12 as well. But if RT=8, then $R_{high}$=10 CPUs, the same as in Scenario 1. In the case where RT=12 CPUs, resource conductor 100 would obtain additional CPUs for an application currently allocated less than 7 CPUs, and would release CPU resources in excess of 12. This strategy allows resource conductor 100 to guarantee the response time Service Level Agreement without retaining unnecessary resources.

In the above strategy for optimizing CPU allocation while satisfying a Service Level Agreement configured to guarantee response time, the number of resources RT is not requested until actual workload requiring that number is pending. In an alternative embodiment, the number of resource RT is requested proactively in anticipation of receiving workload requiring that number. Furthermore, a limit (CAP) may be placed on $R_{high}$ to ensure that no more than CAP number of resources is retained by the application. In such an embodiment, the high and low boundaries for R for a resource conductor 100 optimizing CPU allocation while satisfying a Service Level Agreement configured to guarantee response time are represented mathematically as follows:

$$R_{low} = \max[\text{ceiling}[\text{total pending workload units}/HWM, RT]]$$

$$R_{high} = \min[\text{floor}[\text{total pending workload units}/LWM], CAP]$$

The above scenarios are provided for example only, and disclosed resource conductor 100 is operable to optimize resource allocation according to any provided Service Level Agreement (SLA). For example, a provided SLA configured to model historical resource allocation patterns would require resource conductor 100 to determine $R_{high}$ and $R_{low}$ based on historical workload reception, while a provided SLA configured to minimize remote grid access would require resource conductor 100 to request resources from the local grid resource manager prior to requesting resources from a remote grid resource manager.

In the depicted embodiment of FIG. 1, once resource conductor 100 determines that the quantity of resources allocated to an application requires adjusting, resource conductor 100 communicates with resource manager 120. Resource manager 120 manages multiple resources 125 of various types, including hardware resources such as servers, clients, mainframe computers, networks, network storage, databases, memory, CPU time, scientific instruments, and other computing devices, as well as software resources, software licenses, data sets, available network services, and other types of resources. In embodiments not shown, resource conductor 100 is in communication with additional resource managers, with each resource manager managing a separate group of resources.

To increase the number of resources allocated to an application according to a preferred embodiment, resource conductor 100 sends 131 a resource request message to resource manager 120. This request is typically for a particular number of resources of a particular type, but in some embodiments may be for a unique identified resource. Upon receiving 132 a resource allocation message from resource manager 120, resource conductor 100 passes 133 the resource allocation message on to application manager 110. This message will include information identifying the particular resource or resources that have been allocated to the application, allowing application manager 110 to connect to and use the identified resource or resources for processing the application's associated workload.

To decrease the number of resources allocated to an application according to a preferred embodiment, resource conductor 100 receives 140 a resource release message from application manager 110 indicating that the workload processing associated with a particular resource or resources is complete. Resource conductor 100 then determines a quantity R representing the quantity of resources of the type identified in the resource release message appropriate for processing the pending workload units in accordance with the Service Level Agreement (SLA). As described above for a preferred embodiment, R is a range of integer values wherein the low boundary of the range for R represents the minimum quantity of resources appropriate for processing the total pending workload for the application in accordance with the SLA, while the high boundary of the range for R represents the maximum quantity of resources appropriate for processing the total pending workload for the application in accordance with the SLA. If resource conductor 100 determines that a greater number of resources are allocated to the application than are necessary to guarantee the SLA, then resource conductor 100 sends 141 one or more resource release messages to resource manager 120, and receives 142 a release acknowledgement in return for each resource release message sent.

In a preferred embodiment, resource conductor 100 is operable to process requests from resource manager 120 to reclaim resources that are currently allocated to an application. There are a variety of reasons that resource manager 120 may need to reclaim a resource, such as for scheduled maintenance or to satisfy another higher priority request. If resource conductor 100 receives 160 a resource reclaim message specifying a particular resource or resources, then resource conductor 100 passes 161 the message on to application manager 110. Application manager 110 then processes the request and sends 162 a resource release message to resource conductor 100. Resource conductor 100 then passes 163 the resource release message on to resource manager 120 and receives 164 a release acknowledgement in return.

Resource conductor 100 may receive 160 a resource reclaim message specifying a number of resources of a particular type rather than specifying a particular resource or resources. In a preferred embodiment, resource conductor 100 passes 161 the resource reclaim message on to application manager 110 and application manager 110 decides which resource or resources to release. In an alternative embodiment, resource conductor 100 decides which resource or resources to release and sends 161 a specific resource reclaim message to application manager 110. Application manager 110 then processes the request and sends 162 a resource release message to resource conductor 100. Resource conductor 100 then passes 163 the resource release message on to resource manager 120 and receives 164 a release acknowledgement in return.

The reclaiming of resources by resource manager 120 can cause the quantity N, which represents the number of resources of the type identified in the resource reclaim message allocated to an application, to fall below the quantity R, which represents a quantity of resources of the type identified in the resource reclaim message appropriate for processing the application's pending workload units in accordance with the Service Level Agreement (SLA). In a preferred embodiment, if resource conductor 100 determines that a lesser number of resources are allocated to the application than are necessary to guarantee the SLA, then resource conductor 100 requests additional resources from resource manager 120.

Decoupling application management and resource management creates the need for synchronization procedures to ensure system reliability. For example, in the preferred embodiment, a crossover condition can occur when resource manager 120 reclaims a resource, but before the reclamation procedure completes, application manager 110 voluntarily release the same resource. A similar crossover condition can occur when application manager 110 voluntarily releases a resource, but before the release procedure completes, resource manager 120 reclaims the same resource. Synchronization procedures are also needed for disaster recovery, such as when a machine hosting either the application manager, the resource manager, or the resource conductor crashes or is rebooted. Without synchronization procedures, resource manager 120 could attempt to allocate a resource that is already sufficiently utilized resulting in resource overload. In addition, resource manager 120 could neglect to allocate a resource, resulting in resource starvation.

A preferred embodiment provides for synchronization procedures. Resource manager 120 maintains the allocation status for resources 125, while application manager 110 maintains the allocation status for applications 115. Application manager 110 can send 150 a recover message to resource conductor 100, which passes 151 the recover message on to resource manager 120. Resource manager 120 then reports 152 its allocation status to resource conductor 100, which passes 153 the report on to application manager 110. In an embodiment not shown, resource manager 120 can send a recover message to resource conductor 100, which passes the recover message on to application manager 110. Application manager 110 then reports its allocation status to resource conductor 100, which passes the report on to resource manager 120.

Synchronization procedures are useful at least in the event of a system failure. For example, the resource manager may need to reclaim resources from a first application manager while the first application manager is offline due to failure. When the first application manager recovers, it compares its allocation status before failure with the allocation status reported by the resource manager. If the resource manager reports that it has allocated resources reclaimed from the first application manager to a second application manager, the first application manager must release those reclaimed resources. Furthermore, the first application manager may need to request additional resources to replace those that were reclaimed.

It should be understood that although FIG. 1 depicts a single resource conductor in communication with a single application manager and a single resource conductor, embodiments of this disclosure contemplate configurations in which a single resource conductor is in communication with multiple application managers, multiple resource conductors, or both multiple application managers and multiple resource conductors.

Figure 2:
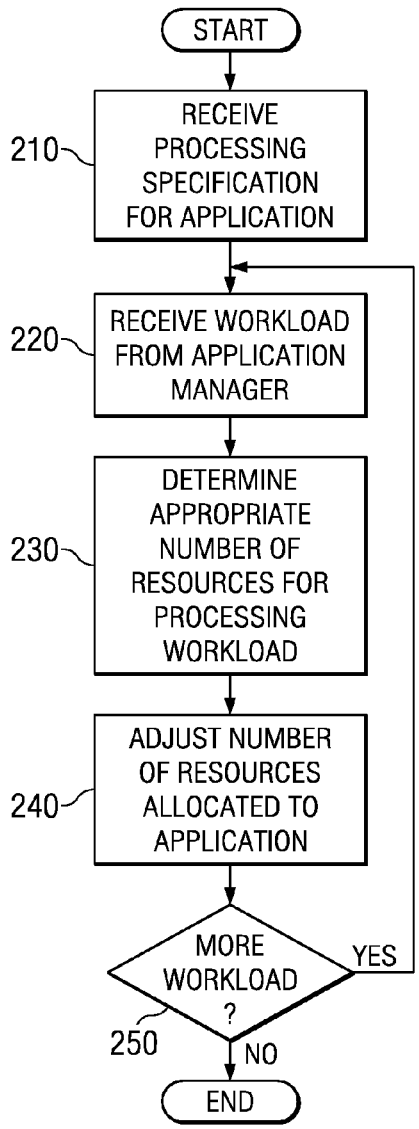
FIG. 2 is flow diagram depicting an exemplary method for achieving efficient utilization of available shared resources in a distributed computing environment through the use of a resource conductor.

FIG. 2 is flow diagram depicting an exemplary method for achieving efficient utilization of available shared resources in a distributed computing environment through the use of a resource conductor. A resource conductor receives 210 a processing specification for an application and also receives 220 workload associated with the application. The processing specification provides the resource conductor with information needed to determine the type and quantity of resources appropriate for processing the workload associated with the application.

In a preferred embodiment, the processing specification comprises a resource type identifier component and a separate Service Level Agreement (SLA) component. The resource type identifier component determines what type of resource is required to process the workload, and is provided to the resource conductor by the application manager either concurrently with the workload or as a separate transmission. The resource type identifier may specify a particular resource type and may further specify required resource attributes, as well as other resource characteristics.

The Service Level Agreement (SLA) component provides the resource conductor with information necessary to properly determine 230 the quantity of resources identified by the resource type identifier that should be allocated to the application in order to process the workload. The SLA may be unique to an individual application, or may cover multiple applications. The SLA may be unique to a particular resource type, or may cover multiple resource types. Examples of SLAs include SLAs configured to minimize resource allocation, SLAs configured to maximize the throughput, SLAs configured to minimize response time, SLAs configured to minimize cost, and SLAs configured to model historical resource allocation patterns, although other configurations are contemplated.

Using the information provided in the SLA, the resource conductor determines 230 a quantity R. This quantity R represents a quantity of resources of the type specified by the resource type identifier that should be allocated to the application for processing the pending workload units. The quantity R can be a single integer value or a range of integer values. In a preferred embodiment, the quantity R is a range of integer values, wherein the low boundary of the range for R represents the minimum quantity of resources appropriate for processing the total pending workload for the application in accordance with the SLA, while the high boundary of the range for R represents the maximum quantity of resources appropriate for processing the total pending workload for the application in accordance with the SLA. The resource conductor uses the quantity R in determining how to adjust 240 a quantity N, wherein the quantity N is the quantity of resources of the specified type currently allocated to the application. If N is equal to R, or if N falls within the range represented by R, then the appropriate number of resources are allocated to the application. If N is not equal to R, or if N falls outside of the range represented by R, then the resource conductor will adjust N by either requesting additional resources for the application or releasing excess resources no longer appropriate for the application.

Because the quantity of workload associated with an application is often dynamic, there may be more than one transmission of workload to the resource conductor for a particular application. As long as additional workload remains 250, the resource conductor will repeatedly receive 220 the workload, determine 230 the quantity R, and adjust 240 the quantity N based on the pending workload in accordance with the Service Level Agreement.

Figure 3A:
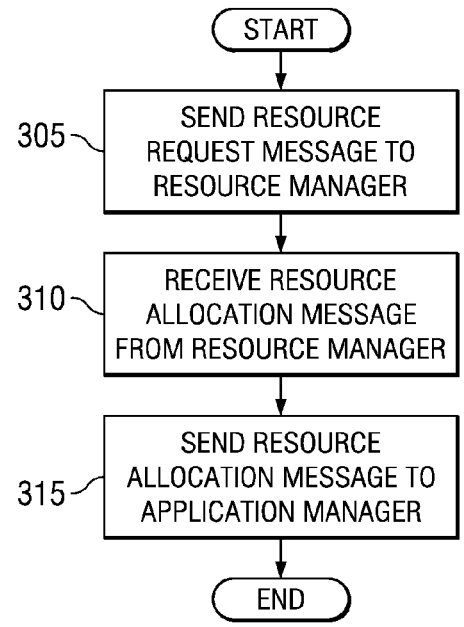
FIG. 3A is a flow diagram depicting a representative method for allocating resources in a distributed computing environment.

FIG. 3A is a flow diagram depicting a representative method for allocating resources in a distributed computing environment. The resource conductor sends 305 a resource request message to the resource manager. This request is typically for a particular number of resources of a particular type, but in some embodiments may be for a unique individual resource. Upon receiving 310 a resource allocation message from the resource manager, the resource conductor sends 315 the resource allocation message on to the application manager. This resource allocation message will include information identifying the particular resource or resources that have been allocated to the application, allowing the application manager to connect to and use the identified resource or resources for processing the application's associated workload.

It should be understood that although FIG. 3A depicts a single resource allocation message received in response to a single resource request message, embodiments of this disclosure contemplate configurations in which multiple resource allocation messages are received in response to a single resource request message. In such embodiments, the resource manager determines whether the requested number and type of resources requested in the resource request message are available within the bounds of its policy. Consequently, in such embodiments, the resource conductor must be configured to receive multiple resource allocation messages from the resource manager in response to a single resource request message.

Figure 3B:
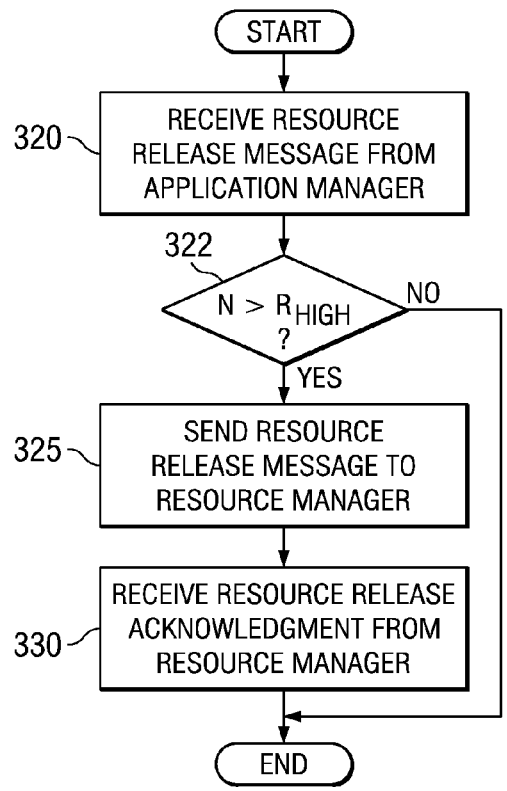
FIG. 3B is a flow diagram depicting a representative method for releasing resources in a distributed computing environment.

FIG. 3B is a flow diagram depicting a representative method for releasing resources in a distributed computing environment. The resource conductor receives 320 a resource release message from the application manager indicating that the workload processing associated with a particular resource or resources is complete. The resource conductor then determines a quantity R representing the quantity of resources of the type identified in the resource release message appropriate for processing the pending workload units in accordance with the Service Level Agreement (SLA). As described above for a preferred embodiment, R is a range of integer values wherein the low boundary of the range for R represents the minimum quantity of resources appropriate for processing the total pending workload for the application in accordance with the SLA, while the high boundary of the range for R represents the maximum quantity of resources appropriate for processing the total pending workload for the application in accordance with the SLA. If the resource conductor determines 322 that a greater number of resources are allocated to the application than are necessary to guarantee the SLA, then the resource conductor sends 325 a resource release messages to the resource manager and receives 330 a release acknowledgement in return.

Figure 3C:
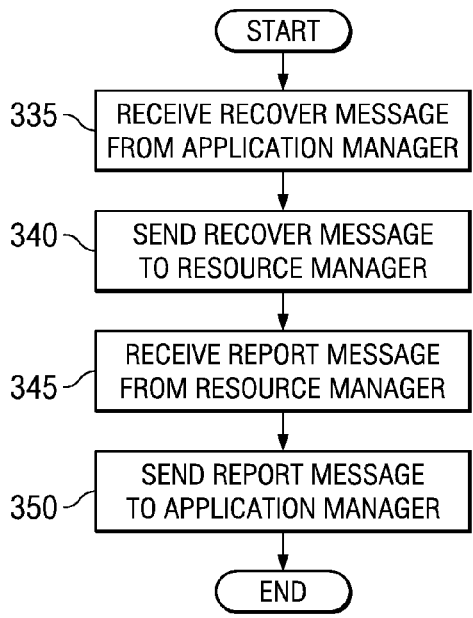
FIG. 3C is a flow diagram depicting a representative method for synchronizing resource allocation after system failure in a distributed computing environment.

FIG. 3C is a flow diagram depicting a representative method for synchronizing resource allocation after system failure in a distributed computing environment. The resource conductor receives 335 a recover message from the application manager, and sends 340 the recover message on to the resource manager. The resource conductor then receives 345 a report from the resource manager indicating the resource manager's resource allocation status. The resource conductor then sends 350 the report on to the application manager.

Figure 3D:
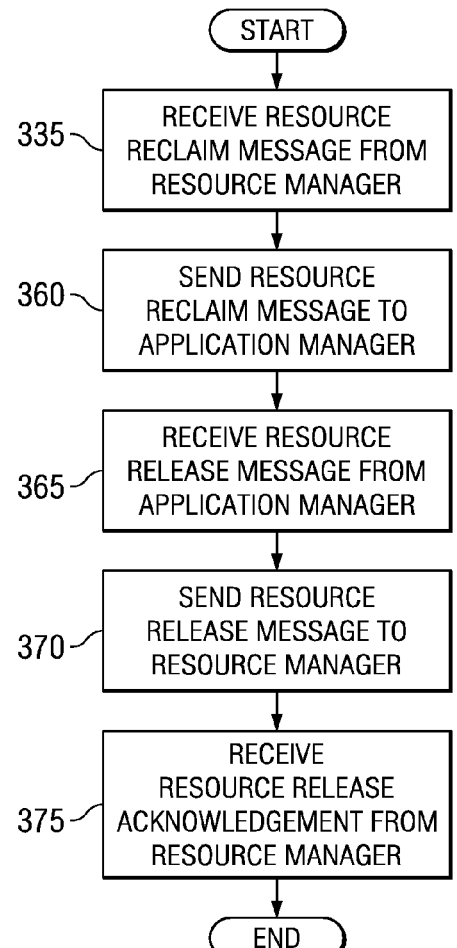
FIG. 3D is a flow diagram depicting a representative method for reclaiming resources in a distributed computing environment.

FIG. 3D is a flow diagram depicting a representative method for reclaiming resources in a distributed computing environment. The resource conductor receives 355 a resource reclaim message specifying a particular resource or resources from the resource manager. The resource conductor then sends 360 the resource reclaim message on to the application manager. The application manager then processes the request and sends 365 a resource release message to the resource conductor, identifying the reclaimed resource as released. The resource conductor then sends 370 the resource release message on to the resource manager and receives 375 a release acknowledgement in return.

Figure 4:
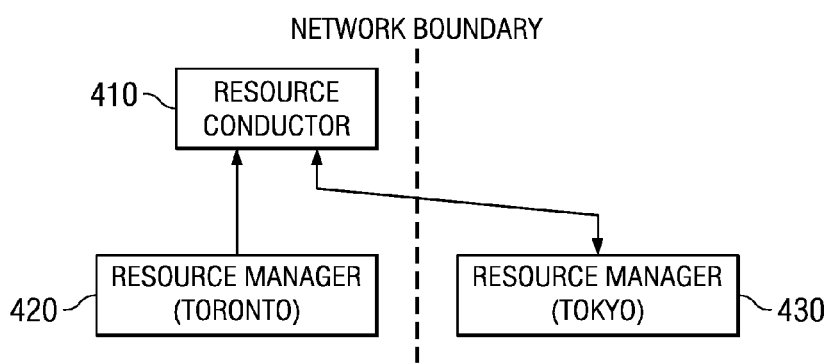
FIG. 4 is a block diagram depicting an exemplary system for achieving efficient utilization of available shared resources in a distributed computing environment through the use of a resource conductor.

FIG. 4 is a block diagram depicting an exemplary system for achieving efficient utilization of available shared resources in a distributed computing environment through the use of a resource conductor. In the embodiment shown in this simplified diagram, resource conductor 410 is in communication with two resource managers. Resource manager 420, physically located in Toronto, manages a local grid, while resource manager 430, physically located in Tokyo, manages a remote grid. Resource conductor 410 can request resources from local resource manager 420, from remote resource manager 430, or both, depending on application workload and the governing Service Level Agreement.

While various embodiments of a method and system for optimizing resource management in a distributed computing environment through the use of a resource conductor according to the present disclosure have been described above, it should be understood that these have been presented by way of example only, and not limitation. Thus, the breadth and scope of the invention should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

We claim:

1. A method for managing shared computing resources in a distributed computing environment, wherein at least one application manager manages at least one application comprising a plurality of workload units, and wherein at least one resource manager, logically distinct from the at least one application manager, manages a plurality of resources capable of processing at least some of the plurality of workload units, the method comprising:

receiving, by a resource conductor, hosted by a computing system, logically distinct from both the at least one application manager and the at least one resource manager, a processing specification for a first application, wherein the first application is associated with a first application manager, wherein the processing specification affects a first quantity N, and wherein the first quantity N represents a quantity of the plurality of resources allocated to the first application;

receiving by the resource conductor information related to at least one of the plurality of workload units associated with the first application from the first application manager;

determining by the resource conductor a first quantity R, wherein the first quantity R represents a quantity of the plurality of resources appropriate for processing the workload units associated with the first application in accordance with the processing specification for the first application; and based on the determined first quantity R, adjusting by the resource conductor the first quantity N of resources allocated to the first application, wherein the adjusting the first quantity N is accomplished at least in part by communicating with the at least one resource manager.

2. A method according to claim 1, wherein the first quantity R is an integer value.

3. A method according to claim 1, wherein the first quantity R is a range of integer values.

4. A method according to claim 1, wherein the adjusting the first quantity N comprises sending an outbound message to a first resource manager.

5. A method according to claim 4, wherein the outbound message comprises a Resource Request message.

6. A method according to claim 4, wherein the adjusting the first quantity N further comprises receiving an inbound message from the first resource manager in response to the outbound message.

7. A method according to claim 6, wherein the outbound message comprises a Resource Request message and the inbound message comprises a Resource Allocation message.

8. A method according to claim 7, wherein the adjusting the first quantity N further comprises communicating the received Resource Allocation message to the first application manager.

9. A method according to claim 4, wherein the outbound message comprises a Resource Release message.

10. A method according to claim 9, wherein the adjusting the first quantity N further comprises receiving the Resource Release message from the first application manager prior to the sending of the Resource Release to the first resource manager.

11. A method according to claim 4, wherein the adjusting the first quantity N further comprises sending an outbound message to a second resource manager.

12. A method according to claim 1, wherein the at least one resource manager comprises a local resource manager.

13. A method according to claim 1, wherein the at least one resource manager comprises a remote resource manager.

14. A method according to claim 1, further comprising:
receiving by the resource conductor a Resource Reclaim message from a first resource manager,
wherein the adjusting the first quantity N is further based on the received Resource Reclaim message.

15. A method according to claim 14, wherein the adjusting the first quantity N comprises communicating the received Resource Reclaim message to the first application manager, receiving a Resource Release message from the first application manager, and communicating the received Resource Release message to the first resource manager.

16. A method according to claim 1, wherein the processing specification comprises a Service Level Agreement.

17. A method according to claim 16, wherein the Service Level Agreement is configured to minimize resource allocation.

18. A method according to claim 16, wherein the Service Level Agreement is configured to maximize throughput.

19. A method according to claim 16, wherein the Service Level Agreement is configured to minimize response time.

20. A method according to claim 16, wherein the Service Level Agreement is configured to minimize cost.

21. A method according to claim 16, wherein the Service Level Agreement is configured to model historical resource allocation patterns.

22. A method according to claim 16, wherein the processing specification further comprises a resource type identifier.

23. A method according to claim 1, wherein the receiving of the information related to at least one of the plurality of workload units further comprises receiving information related to each of the at least one of the plurality of workload units individually, and wherein the determining of the first quantity R and the adjusting of the first quantity N are repeated as information related to each of the at least one of the plurality of workload units is received.

24. A method according to claim 1, wherein the information related to at least one of the plurality of workload units associated with the first application comprises the actual at least one of the plurality of workload units associated with the first application.

25. A method according to claim 1, further comprising:
receiving by the resource conductor a processing specification for a second application, wherein the second application is associated with a second application manager, wherein the processing specification affects a second quantity N, and wherein the second quantity N represents a quantity of the plurality of resources allocated to the second application;
receiving by the resource conductor information related to at least one of the plurality of workload units associated with the second application from the second application manager;
determining by the resource conductor a second quantity R, wherein the second quantity R represents a quantity of the plurality of resources appropriate for processing the workload units associated with the second application in accordance with the processing specification for the second application; and
based on the determined second quantity R, adjusting by the resource conductor the second quantity N of resources allocated to the second application, wherein the adjusting the second quantity N is accomplished at least in part by communicating with the at least one resource manager.

26. A method according to claim 25, wherein the adjusting the first quantity N comprises sending an outbound message to a first resource manager.

27. A method according to claim 26, wherein the adjusting the second quantity N comprises sending an outbound message to the first resource manager.

28. A method according to claim 26, wherein the adjusting the second quantity N comprises sending an outbound message to a second resource manager.

* * * * *